United States Patent
Plebani et al.

(10) Patent No.: US 11,461,142 B2
(45) Date of Patent: Oct. 4, 2022

(54) AUTOMATIC MEMORY MANAGEMENT METHOD, CORRESPONDING MICRO-CONTROLLER UNIT AND COMPUTER PROGRAM PRODUCT

(71) Applicant: STMicroelectronics S.r.l., Agrate Brianza (IT)

(72) Inventors: Emanuele Plebani, Sotto Il Monte Giovanni XXIII (IT); Mirko Falchetto, Milzano (IT); Danilo Pietro Pau, Sesto San Giovanni (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 160 days.

(21) Appl. No.: 16/924,091

(22) Filed: Jul. 8, 2020

(65) Prior Publication Data
US 2021/0026695 A1    Jan. 28, 2021

(30) Foreign Application Priority Data
Jul. 22, 2019    (IT) .................. 102019000012609

(51) Int. Cl.
*G06F 9/50*       (2006.01)
*G06F 9/48*       (2006.01)
(Continued)

(52) U.S. Cl.
CPC ............ *G06F 9/5016* (2013.01); *G06F 9/321* (2013.01); *G06F 9/4881* (2013.01); *G06F 9/50* (2013.01);
(Continued)

(58) Field of Classification Search
CPC .... G06F 9/50; G06F 9/501611; G06F 9/5016; G06F 9/5022; G06F 9/48; G06F 9/4881;
(Continued)

(56) References Cited

U.S. PATENT DOCUMENTS

2016/0062655 A1* 3/2016 Landau .............. G06F 12/0246
                                                        711/154
2018/0088996 A1* 3/2018 Rossi .................... G06F 9/5016
(Continued)

OTHER PUBLICATIONS

Arm Developer, "Arm NN : Software Developer Kit (SDK)," downloaded on Jul. 10, 2020 from https://developer.arm.com/ip-products/processors/machine-learning/arm-nn, 12 pages.
(Continued)

*Primary Examiner* — Charles M Swift
(74) *Attorney, Agent, or Firm* — Seed Intellectual Property Law Group LLP

(57) ABSTRACT

Methods, microprocessors, and systems are provided for implementing an artificial neural network. Data buffers in virtual memory are coupled to respective processing layers in the artificial neural network. An ordered visiting sequence of layers of the artificial neural network is obtained. A virtual memory allocation schedule is produced as a function of the ordered visiting sequence of layers of the artificial neural network, the schedule including a set of instructions for memory allocation and deallocation operations applicable to the data buffers. A physical memory configuration dataset is computed as a function of the virtual memory allocation schedule for the artificial neural network, the dataset including sizes and addresses of physical memory locations for the artificial neural network.

18 Claims, 8 Drawing Sheets

(51) Int. Cl.
　　　*G06F 9/32*　　　(2018.01)
　　　*G06N 3/02*　　　(2006.01)
　　　*G06N 3/04*　　　(2006.01)
　　　*G06N 3/063*　　(2006.01)
　　　*G06F 12/06*　　(2006.01)
　　　*G06F 9/54*　　　(2006.01)

(52) U.S. Cl.
　　　CPC .......... *G06F 9/5011* (2013.01); *G06F 9/5022* (2013.01); *G06F 9/544* (2013.01); *G06F 12/0646* (2013.01); *G06N 3/02* (2013.01); *G06N 3/0454* (2013.01); *G06N 3/063* (2013.01)

(58) Field of Classification Search
　　　CPC . G06F 9/544; G06N 3/00; G06N 3/02; G06N 3/0454; G06N 3/063
　　　See application file for complete search history.

(56) References Cited

U.S. PATENT DOCUMENTS

| | | | | |
|---|---|---|---|---|
| 2018/0365558 | A1* | 12/2018 | Sekiyama | ............... G06N 3/04 |
| 2019/0042925 | A1 | 2/2019 | Choe et al. | |
| 2019/0187963 | A1* | 6/2019 | Bokhari | ............... G06N 3/02 |
| 2019/0384790 | A1* | 12/2019 | Bequet | ............. G06F 16/90344 |
| 2020/0042859 | A1* | 2/2020 | Mappouras | ............ G06N 3/084 |

OTHER PUBLICATIONS

Austrin et al., "Inapproximability of Treewidth, One-Shot Pebbling, and Related Layout Problems," arXiv: 1109.4910v1: 2011, 25 pages.

Chaitin, "Register Allocation and Spilling via Graph Coloring," *CM Sigplan Notices* 17(6):98-105, 1982.

Howard et al., "MobileNets: Efficient Convolutional Neural Networks for Mobile Vision Applications," arXiv:1704.04861v1: 2017, 9 pages.

Iandola et al., "SqueezeNet: Alexnet-Level Accuracy with 50x Fewer Parameters and <0.5mb Model Size," arXiv:1602.07360v4: 2016, 13 pages.

Lai et al., "CMSIS-NN: Efficient Neural Network Kernels for Arm Cortex-M CPUs," arXiv:1801.06601v1: 2018, 10 pages.

Renesas Electronics, "e-AI Solution," downloaded on Jul. 10, 2020 from https://www.renesas.com/en-in/solutions/key-technology/e-ai.html, 7 pages.

Sethi, "Complete register allocation problems," *SIAM journal on Computing*, 4(3), 226-248, 1975.

Szegedy et al., "Rethinking the Inception Architecture for Computer Vision," IEEE Conference on Computer Vision and Pattern Recognition (CVPR), Jun. 27-30, 2016, Las Vegas, Nevada, 9 pages.

\* cited by examiner

AUTOMATIC MEMORY MANAGEMENT METHOD, CORRESPONDING MICRO-CONTROLLER UNIT AND COMPUTER PROGRAM PRODUCT

BACKGROUND

Technical Field

The description relates to memory allocation methods and more particularly to allocation of memory in artificial neural networks (briefly, ANN).

Description of the Related Art

Artificial neural networks (ANN) comprise computing frameworks configured to process large quantities of data.

Such ANN processing generally comprises two phases:
  a training stage wherein the ANN adaptively "learns" to perform tasks by considering examples (called training data set), generally without being programmed with any task-specific rules; and
  an inference stage, wherein the trained ANN may be used for making broad predictions about general input data, and iteratively refining the predictions.

For example, consider the task of classifying whether or not an animal is a dog or cat based on its length and height. A training set may include thousands of [height, weight, cat/dog] tuples, such as [10, 6, cat]. The artificial neural network may take this data and "learn" the dividing lines between cats and dogs based on height and weight. Then, given an unclassified data entry, the ANN determines whether it is a dog or cat and a confidence level of the classification.

In general, an ANN may be arranged in a plurality of "layers," and different types of predictions may be made at each layer.

An ANN model may be trained suitably for application in different domains, e.g., ANNs can be used to learn word patterns in sentences or Keyword Spotting, to prevent tool faults as in predictive maintenance, for (e.g., inertial sensors) signal processing as in Human Activity Recognition and for many other learning-based tasks too.

Execution speed of such complex data processing tasks may heavily rely on how the code is mapped on the computational and memory resources employed.

Specifically, memory allocation may represent a bottleneck, particularly in the case wherein memory resources (e.g., RAM) may be limited, such as in a memory-constrained micro-controller unit, briefly MCU. A reduced RAM memory availability, for instance, may limit the models a user can map on a processing device.

Memory allocation is the process of assigning sections of memory in a program to be used to store computed variable values. The task of fulfilling an allocation request consists of locating a block of unused memory of sufficient size. Memory requests may be satisfied by allocating portions from a large pool of memory called the heap or free store. At any given time, some parts of the heap are in use, while some are "free" (unused) and thus available for future allocations.

Existing solutions mainly envisage mapping ANN to memory by hand-coding, increasing implementation time and costs. Automating such a process may be an interesting feature for an MCU.

In general, automatic optimal memory allocation may be modelled as a so called "Pebble game" on a graph, for instance as disclosed in document Sethi, R. (1975). Complete Register Allocation Problems. SIAM Journal on Computing, 4(3), 226-248. https://doi.org/10.1137/0204020. As discussed in document Austrin, P., Pitassi, T., & Wu, Y. (2012). Inapproximability of Treewidth, One-Shot Pebbling, and Related Layout Problems, In Approximation, Randomization, and Combinatorial Optimization, Algorithms and Techniques (pp. 13-24). Springer Berlin Heidelberg. https://doi.org/10.1007/978-3-642-32512-0_2, the general problem of finding the optimal solution may be regarded as intractable (NP-hard). Using some assumptions and considering the specific target domain, some specialized methods may be found to be more efficient than others.

A related problem is optimal register allocation given a set of computations and their data dependencies, as discussed in Chaitin, G. J. (1982). Register allocation & spilling via graph coloring. In Proceedings of the 1982 SIGPLAN symposium on Compiler construction—SIGPLAN '82. ACM Press. https://doi.org/10.1145/800230.806984.

Some previous solutions operate using fixed memory data resources and buffers with a same dimension. Operations using data types of varying width may be a computationally hard task for such memory-constrained processing units.

Fixed-size blocks allocation, also called memory pool allocation, uses a free list of fixed-size blocks of memory (often all of the same size). The solution may work for simple embedded systems where no large objects need to be allocated, but suffers from fragmentation, especially with long memory addresses.

Some implementations, such as ARM NN SDK tool (https://developer.arm.com/products/processors/machine-learnindarm-nn), may comprise code-blocks tailored for automatically implementing common neural network operations, such as convolution and pooling. Other implementations, such as Renesas e-AI (https://www.renesas.com/en-in/solutions/key-technology/e-ai.html), may be limited to specific network topologies.

BRIEF SUMMARY

In view of the foregoing issues of memory allocation and optimization, embodiments of the present disclosure provide technologies that facilitate improving upon limitations of previously-implemented ANNs.

A computer-implemented method may be summarized as comprising coupling data buffers in virtual memory circuitry to respective processing layers of an artificial neural network; obtaining an ordered visiting sequence of layers of the artificial neural network; producing, as a function of the ordered visiting sequence of layers, a virtual memory allocation schedule that includes a set of instructions that specify memory allocation operations and memory deallocation operations applicable to the data buffers; and computing, based on the virtual memory allocation schedule, a physical memory configuration dataset for the artificial neural network circuit, the physical memory configuration dataset comprising sizes and addresses of physical memory locations for the artificial neural network.

According to an embodiment, the method may comprise configuring data processing circuitry for the artificial neural network according to a directed acyclic graph representing the virtual memory allocation schedule, wherein data buffer nodes in the data buffers in the virtual memory circuitry are coupled to respective layer processing nodes in the processing layers of the artificial neural network. According to an embodiment, the method may comprise parsing the directed acyclic graph; and determining dependencies between the processing layers of the artificial neural network circuit. According to an embodiment, the method may comprise initializing a first reference count for a first visited data buffer in the virtual memory circuitry coupled to a first processing layer in the artificial neural network circuit to a first value equal to a number of processing layers of the artificial neural network circuit coupled to the first visited data buffer; generating a memory allocation command for the first visited data buffer having the first reference count initialized; initializing a second reference count for a second visited data buffer in the virtual memory circuitry coupled to a second processing layer in the artificial neural network circuit to a second value equal to the number of processing layers of the artificial neural network circuit coupled to the second visited data buffer; decrementing the second reference count as a result of visiting one of the processing layers coupled to the second visited data buffer; decrementing the first reference count as a result of visiting one of the processing layers coupled to the first visited data buffer; determining whether the first reference count or the second reference count equals a value of zero as a result of the decrementing; deallocating, as a result of determining that the first reference count or the second reference count reached zero, a visited data buffer whose reference count has reached zero; and iterating the set of sequential operations until an end of the ordered visiting sequence of layers of the artificial neural network is reached.

According to an embodiment, the method may comprise initializing a list of memory intervals comprising a set of tuples including values indicative of a base physical memory address and of a maximum heap size; and sequentially parsing the set of instructions included in the virtual memory allocation schedule; as a result of parsing an instruction in the set of instructions to allocate a first data buffer determining, in the list of memory intervals, a temporary memory interval having a smallest size sufficient to store the first data buffer; allocating the first data buffer in the temporary memory interval; and updating the list of memory intervals to indicate the temporary memory interval as allocated; and as a result of parsing an instruction in the set of instructions to deallocate a second data buffer deallocating the second data buffer from memory; merging a memory interval freed as a result of deallocating the second data buffer with one or more free memory intervals in the list of memory intervals; and updating the list of memory intervals to indicate the memory interval freed, wherein the physical memory configuration dataset is calculated in connection with parsing the set of instructions.

According to an embodiment, the method may comprise tracking each data buffer allocated based on a set of slots referencing one or more memory intervals in the list of memory intervals that store a data buffer name, a starting memory address, or a data buffer size of the data buffer allocated. According to an embodiment, the method may comprise, as a result of parsing the instruction to allocate the first data buffer, executing a first pipeline of operations that include determining whether the set of slots include an available slot; appending a new slot to the set of slots as a result of determining that no slots are available, the new slot being empty; computing a size of an empty slot in the set of slots based on a difference between an address of a next slot subsequent to the empty slot and an address of a previous slot to the empty slot added to a size of the previous slot; comparing the size of the empty slot with a size of the first data buffer; and finding a smallest slot of the set of slots in which the first data buffer fits; as a result of parsing the instruction to deallocate the second data buffer, executing a second pipeline of operations that include: assigning an empty value to a slot containing the second data buffer; appending a coordinate of the slot in the physical memory configuration dataset; as a result of detecting a pair of consecutive empty slots in the set of slots, merging the pair of consecutive empty slots into a single empty slot; and as a result of parsing a last instruction in the set of instructions: removing a third slot at an end of the list of memory intervals if the third slot is empty; and providing, to a processing circuit, the physical allocation configuration dataset that includes memory location addresses of data buffers for implementing the artificial neural network.

According to an embodiment, the method may comprise as a result of the first data buffer size being greater than the size of the empty slot, shifting one or more slots subsequent to the empty slot and allocating the first data buffer to the empty slot; and as a result of the empty slot and the buffer having a same size, allocating the buffer; and as a result of the size of the first data buffer being smaller than the size of the empty slot, introducing a new empty slot between the empty slot and the next slot. According to an embodiment, the method may comprise computing a difference between the size of the first data buffer and the size of the empty slot as $\delta=s_i-S_i$; and computing a set of slot coordinates as a result of adding the difference to an address of a subsequent non-empty slot, wherein shifting the one or more slots is based on the set of slot coordinates.

A system according to one or more embodiments may be summarized as comprising memory that includes virtual memory and physical memory; and at least one processor coupled to the memory, the system configured to couple data buffers in the virtual memory to respective processing layers of an artificial neural network; obtain an ordered visiting sequence of layers of the artificial neural network; produce, as a function of the ordered visiting sequence of layers, a virtual memory allocation schedule that includes a set of instructions that specify memory allocation operations and memory deallocation operations applicable to the data buffers; and compute, based on the virtual memory allocation schedule, a physical memory configuration dataset for the artificial neural network circuit, the physical memory configuration dataset comprising sizes and addresses of physical memory locations for the artificial neural network.

According to an embodiment, the system may be configured to: configure processing circuitry of the one or more processors according to a directed acyclic graph representing the virtual memory allocation schedule, wherein data buffer nodes in the data buffers in the virtual memory circuitry are coupled to respective layer processing nodes in the processing layers of the artificial neural network. According to an embodiment, the system may be configured to parse the directed acyclic graph; and determine dependencies between the processing layers of the artificial neural network circuit.

According to an embodiment, the system may be configured to initialize a list of memory intervals that includes a set of tuples having values indicative of a base physical memory address and of a maximum heap size; and sequentially parse the set of instructions included in the virtual memory allocation schedule, wherein for an instruction parsed in the set of instructions to allocate a first data buffer, allocate the first data buffer to a temporary memory interval having a smallest size sufficient to store the first data buffer; for an instruction parsed in the set of instructions to deallocate a second data buffer, deallocate the second data buffer from memory; and merge a memory interval freed as a result of deallocating the second data buffer with one or more free memory intervals in the list of memory intervals; and update the list of memory intervals based on allocation or deallocation of data buffers specified in the set of instructions, the physical memory configuration dataset in connections calculated in connection with parsing the set of instructions.

According to an embodiment, the system may be configured to track each data buffer allocated based on a set of slots referencing one or more memory intervals in the list of memory intervals that store a data buffer name, a starting memory address, or a data buffer size of the data buffer allocated. According to an embodiment, the system may be configured to initialize a first reference count for a first visited data buffer in the virtual memory circuitry coupled to a first processing layer in the artificial neural network circuit to a first value equal to a number of processing layers of the artificial neural network circuit coupled to the first visited data buffer; initialize a second reference count for a second visited data buffer in the virtual memory circuitry coupled to a second processing layer in the artificial neural network circuit to a second value equal to the number of processing layers of the artificial neural network circuit coupled to the second visited data buffer; decrement the first reference count as a result of visiting one of the processing layers coupled to the first visited data buffer; decrement the second reference count as a result of visiting one of the processing layers coupled to the second visited data buffer; determine whether the first reference count or the second reference count reached a value of zero as a result of the first reference count and the second reference count being decremented; deallocate, as a result of a determination that the first reference count or the second reference count reached zero, a visited data buffer whose reference count has reached zero; and iterate the set of sequential operations until an end of the ordered visiting sequence of layers of the artificial neural network is reached.

A non-transitory computer-readable media according to one or more embodiments may be summarized as storing instructions that, as a result of execution by one or more processors, cause the processors to couple data buffers in the virtual memory to respective processing layers of an artificial neural network; obtain an ordered visiting sequence of layers of the artificial neural network; produce, as a function of the ordered visiting sequence of layers, a virtual memory allocation schedule that includes a set of instructions that specify memory allocation operations and memory deallocation operations applicable to the data buffers; and compute, based on the virtual memory allocation schedule, a physical memory configuration dataset for the artificial neural network circuit, the physical memory configuration dataset comprising sizes and addresses of physical memory locations for the artificial neural network.

According to an embodiment, execution of the instructions stored in the non-transitory computer-readable media cause the processors to configure processing circuitry of the one or more processors according to a directed acyclic graph representing the virtual memory allocation schedule, wherein data buffer nodes in the data buffers in the virtual memory circuitry are coupled to respective layer processing nodes in the processing layers of the artificial neural network. According to an embodiment, execution of the instructions stored in the non-transitory computer-readable media cause the processors to parse the directed acyclic graph; and determine dependencies between the processing layers of the artificial neural network circuit.

According to an embodiment, execution of the instructions stored in the non-transitory computer-readable media cause the processors to initialize a list of memory intervals that includes a set of tuples having values indicative of a base physical memory address and of a maximum heap size; and sequentially parse the set of instructions included in the virtual memory allocation schedule, allocate, for an instruction parsed in the set of instructions to allocate a first data buffer to a temporary memory interval having a smallest size sufficient to store the first data buffer; deallocate, for an instruction parsed in the set of instructions to deallocate a second data buffer, the second data buffer from memory; merge a memory interval freed as a result of deallocation with one or more free memory intervals in the list of memory intervals; and update the list of memory intervals based on allocation or deallocation of data buffers specified in the set of instructions, the physical memory configuration dataset in connections calculated in connection with parsing the set of instructions.

Input and output data of ANN may be dynamically generated during the inference stage, hence automatic memory allocation, in a context wherein data buffers may have distinct/variable sizes, may be very relevant.

One problem addressed by this proposal is how to reduce, e.g., minimize, the usage of memory by the different layers of a neural network at inference time, for instance when the network is mapped to a microcontroller unit (MCU).

A method for automated ANN layers scheduling and for computing size and addresses of the memory buffers used for ANN layers execution may be exemplary of an embodiment.

One or more embodiments relate to processing circuitry (e.g., MCU, Digital Signal Processor (DSP)) and including local memory circuit blocks and adapted to implement ANN processing.

One or more embodiments may be applied to hardware accelerators that facilitate improved speed in neural network processing.

One or more embodiments may comprise a computer program product loadable in the memory of at least one processing circuit (e.g., a computer) and comprising software code portions for executing the steps of the method when the product is run on at least one processing circuit. As used herein, reference to such a computer program product is understood as being equivalent to reference to computer-readable medium containing instructions for controlling the processing system in order to co-ordinate implementation of the method according to one or more embodiments. Reference to "at least one computer" is intended to highlight the possibility for one or more embodiments to be implemented in modular and/or distributed form.

One or more embodiments may facilitate reducing memory usage by the different layers of an ANN at inference time, e.g., when mapped to a microcontroller unit (MCU).

One or more embodiments may envisage allocating buffers wherein to store temporary inputs and outputs of associated ANN layers according to a given schedule (e.g., execution order).

One or more embodiments may advantageously avoid copies and reducing unused memory by shifting allocated buffers to accommodate a new buffer when the size of the latter exceeds the available free memory interval.

One or more embodiments may facilitate convolutional neural network execution, where the input is initially expanded before undergoing through subsampling stages, e.g., by pooling or filter strides.

One or more embodiments may comprise an off-line code generation stage.

One or more embodiments may be mapped to embedded targets with low memory and low computational power budget, e.g., such as STMicroelectronics STM32 family MCUs and specific derived MCU with dedicated hardware acceleration units.

One or more embodiments may be used by any automotive MCU and/or by a DSP.

One or more embodiments may improve memory allocation efficiency to use the limited RAM available on a device, for instance thanks to reduction of the working memory employed at any point of the execution of the ANN processing.

One or more embodiments facilitate to compute and/or perform an execution sequence for the layers of a complex neural network in a completely automated fashion, as a result of the heuristics of the memory allocation method facilitating to reach optimal or near-optimal memory usage.

One or more embodiments may facilitate to run the same artificial neural network processing on cheaper platforms using less memory.

One or more embodiments may facilitate freeing computational resources to run additional functions.

BRIEF DESCRIPTION OF THE SEVERAL VIEWS OF THE DRAWINGS

One or more embodiments will now be described, by way of non-limiting example only, with reference to the annexed Figures, wherein.

DETAILED DESCRIPTION

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The references used herein are provided merely for convenience and hence do not define the extent of protection or the scope of the embodiments.

The drawings are in simplified form and are not to precise scale. For the sake of simplicity, directional (up/down, etc.) or motional (forward/back, etc.) terms may be used with respect to the drawings. The term "couple" and similar terms do not necessarily denote direct and immediate connections, but also include connections through intermediate elements or devices.

Artificial neural networks (hereinafter, neural networks) are modeled after biological neural networks. The basic architecture of a neural network includes one or more layers of interconnected nodes beginning with one or more input layers, one or more hidden layers and one or more output layers. The number of layers and the number of nodes per layer may be set as part of the neural network architecture. The settings (e.g., number of layers, connections between nodes of layers, etc.) for the architecture of a neural network are also referred to as hyperparameters.

A node's value may be a function (sometimes referred to as an activation or transfer function) of the weighted sums of one or more nodes' values in a previous layer. An example activation function may be a non-linear function such as the logistic function. This value, in turn, may be used as part of an input of a node in the next layer—again, with a weight applied to it. The weights may have an initial value that is changed based on the training set that is run through the neural network. The activation function may be one of the hyperparameters, as well as the rate of change of the value.

Figure 1A:
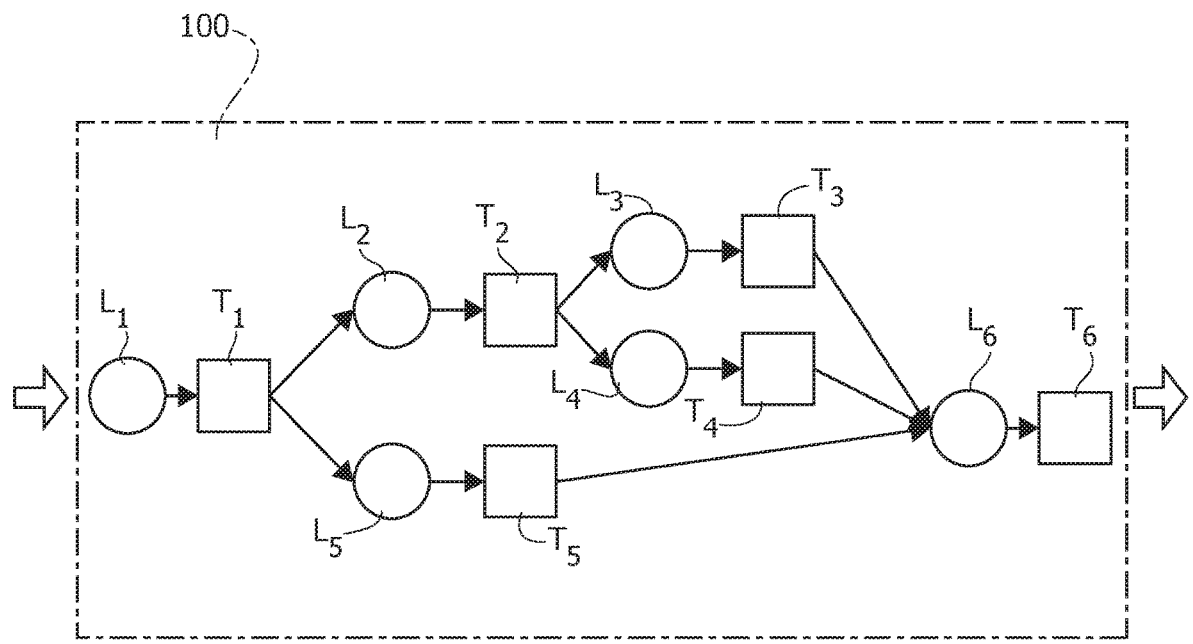
FIG. 1A is an embodiment of a diagram of an acyclic directed graph for an artificial neural network.
Figure 1B:
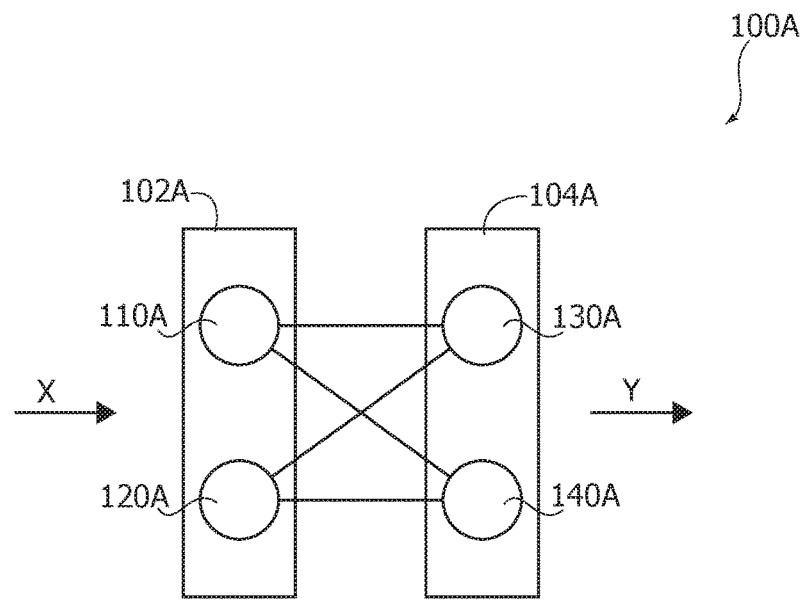
FIG. 1B is an embodiment of a representation of a neural network data processing architecture.

FIG. 1B illustrates a possible representation of a neural network 100A to visualize the architecture of a simplified neural network, according to various examples. The neural network 100A illustrates an input layer 102A, with node 110A and node 120A, and an output layer 104, with nodes 130A and 140A. The neural network 100 does not include a hidden layer for illustration simplicity. The neural network 100A is fully connected because each node in output layer 104A is connected to each node in input layer 102A. The neural network 100 illustrates inputs of x=(x1, x2), e.g., x=(length, height), for nodes 110A and 120A, respectively, and outputs y=(y1,y2), e.g., y=(cat, dog) for nodes 130A and 140A, respectively. The neural network 100 may be implemented in a computer system that includes one or more processors, such as the system 1000 described with respect to FIG. 10.

In one or more embodiments, an ANN processing framework 100 may be modeled as a bipartite graph, as exemplified in FIG. 1A. Specifically, it may be modeled as a Directed Acyclic Graph (DAG) comprising two sets of nodes:

a first set of "layer" nodes L1, L2, L3, L4, L5, L6, (circles in FIG. 1A), which model data processing or operational stages of the artificial neural network 100; and a second set of "tensor" nodes T1, T2, T3, T4, T5, T6, (squares in FIG. 1A), which are indicative of memory access or memorization stages in the neural network processing framework 100.

Specifically:

any node in the first set of layer nodes L1, L2, L3, L4, L5, L6 includes data processing operation performed in a layer of the artificial neural network 100; and any node in the second set of nodes T1, T2, T3, T4, T5, T6 includes at least one data storage operation following a respective data processing stage of the artificial neural network, in order to store the outcome of the preceding neural network layer or processing node.

In one or more embodiments as exemplified in FIG. 1A, nodes in the second set of nodes T1, T2, T3, T4, T5 may be coupled univocally, so that each data buffer (for instance, T1) of each respective tensor node is coupled to only one preceding respective layer node (for instance, L1) and at the same time it may be coupled to one or more following (dependent) respective layer nodes (for instance, L2, L5).

In such a model, for instance:

an act of performing a computation corresponds to an act of "visiting" or "executing" a layer node, e.g., moving in the graph starting from a circle and following the direction of the arrow; and an act of storing temporary inputs and outputs of associated neural network layers in respective data buffers corresponds to visiting a tensor node, e.g., reaching a tensor node from the preceding layer node and moving in the graph following the direction of the arrow departing from the tensor node.

Layers are "executed" in an ordered visiting sequence, wherein a predecessor of a visited layer node has to have been previously visited, e.g., L3 may be visited solely after visiting L1 and L2, as in a topological order. In this way, all the inputs of a layer may be available during execution.

In computer science, a topological sort or topological ordering of a directed graph is a linear ordering of its nodes. Any DAG has at least one topological ordering.

One or more embodiments may comprise an operation of generating or selecting a visiting order for the layers.

It is noted that there may be several sequential visiting orders showing such property. In the following, a sequential ordering of the layers going incrementally from L1 to L6 is assumed, being otherwise understood that such an ordering is purely exemplary and in no way limiting.

Figure 3:
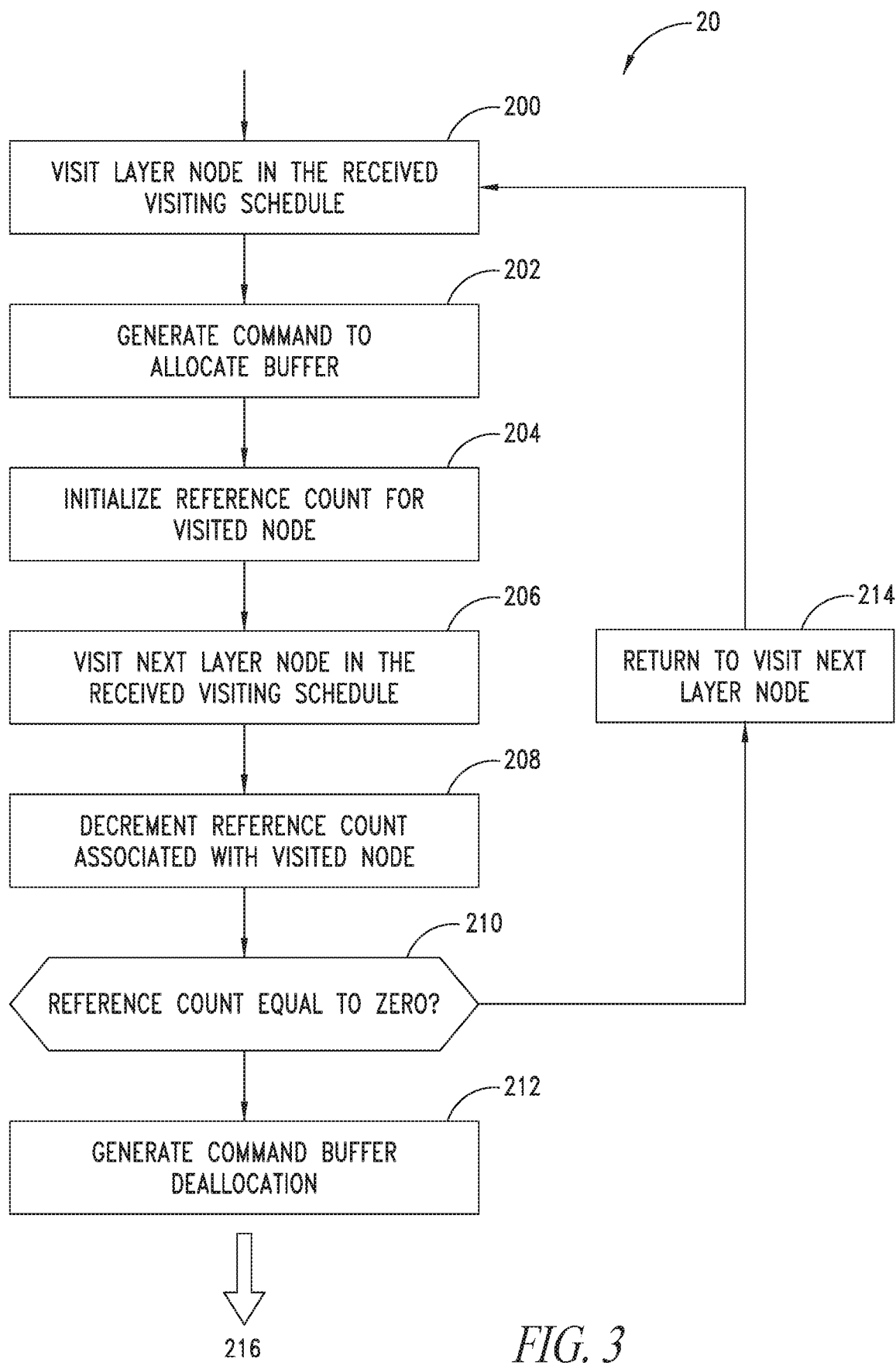
FIG. 3 is an embodiment of a method for generating a virtual memory allocation schedule.

One or more embodiments as exemplified in FIG. 3 may comprise an operation 20 of generating a memory allocation schedule 216 for the neural network 100.

A virtual memory allocation schedule 216 may comprise a set of instructions of various types, such as:

storing or allocating instructions, e.g., store buffer in memory; and/or deallocating instructions, e.g., delete buffer from memory.

In one or more embodiments, instructions in the set of instructions in the virtual memory allocation schedule may be executable on a respective set of data buffers which may be employed in respective nodes in the second set of tensor nodes T1, T2, T3, T4, T5, T6.

For the sake of simplicity, data buffers are named with a reference like the corresponding tensor node wherein they are used. Data buffers in the set of data buffers T1, T2, T3, T4, T5, T6 have respective buffer sizes s1, s2, s3, s4, s5, which may vary from one buffer to another, as a function of the computation performed in the layer nodes preceding the respective tensor nodes.

Figure 2A:
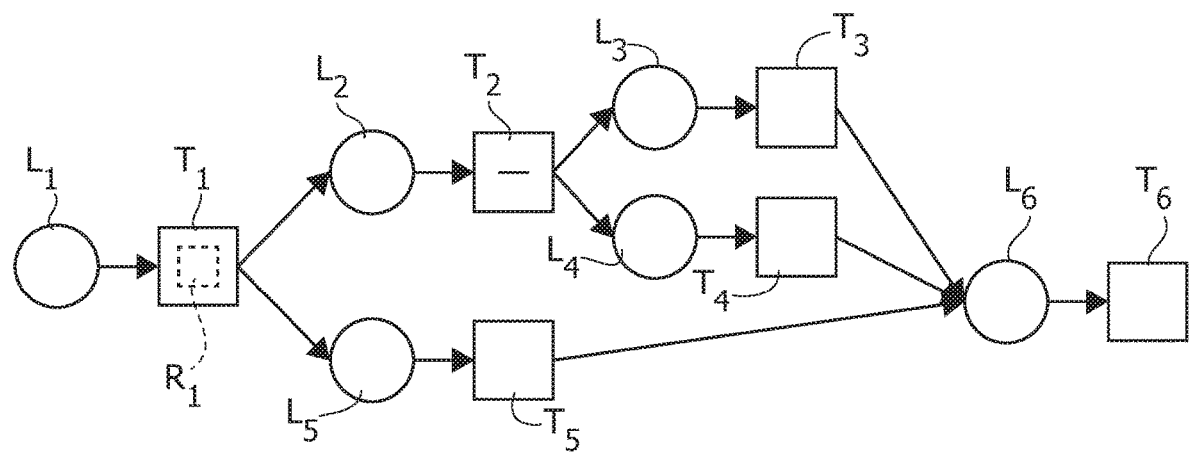
FIG. 2A is an embodiment of a first acyclic directed graph of an artificial neural network.

As exemplified in FIG. 3, generating 20 a virtual memory allocation schedule (or program) for the neural network 100 may comprise:

receiving the generated visiting schedule for the layers;

visiting 200 the first layer node L1 in the received visiting schedule;

generating 202 the command of memory allocating a (new) buffer, e.g., the command to store buffer T1 having size s1, as an output of the i-th visited node, e.g., of the first visited layer L1 tensor node T1;

initializing 204 an i-th reference count Ri for the visited node Ti to a value equal to the number of layers which are coupled to the i-th tensor node Ti, for instance a first reference count R1 may be generated and initialized to a value R1=2 since the first tensor node T1 is coupled to two layer nodes L2, L5, as exemplified in FIG. 2A;

visiting 206 the next layer node in the received scheduled sequence, e.g., for instance a second layer node L2;

decrementing 208 the reference count value associated to the previously visited tensor node after the buffer is retrieved from memory or used as a result of visiting the following layer node, e.g., decrementing the value of the first reference count associated to the first tensor node T1 so that its value becomes R1=1 as a result of having visited the second layer node L2; and checking 210 whether any reference count has a value of zero, and, alternatively:

i) in the case of a positive check 212, generating a command of buffer deallocation for the buffer associated to the tensor node whose reference count has reached zero, or ii) in the case of a negative result of checking in 210, continue visiting the next layers one by one, e.g., iterating 214 the sequence until all layer nodes L1, L2, L3, L4, L5, L6 are visited following the ordered visiting sequence.

As mentioned, reference count of a buffer is incremented when a reference to it is created, and decremented when a reference is used. When the count reaches zero, a command to reclaim the memory where the object may be stored is generated.

Figure 2B:
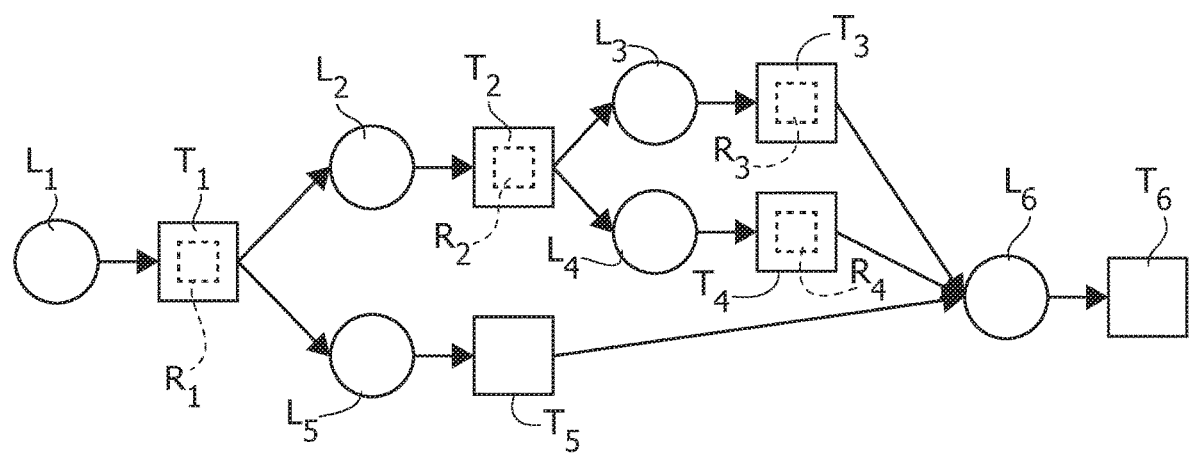
FIG. 2B is an embodiment of a second acyclic directed graph of an artificial neural network.

For instance, FIG. 2B is an exemplary "snapshot" of a stage of the method during an iteration of the method 20, e.g., in a state in which a fifth layer node L5 is the next to be visited.

In the exemplary stage of FIG. 2B, for instance:

the first reference count R1 has a first value, e.g., R1=1;

the second reference count R2 has a second value, e.g., R2=0; and the third and fourth reference counts R3, R4 have the same value of R1, e.g., R3=R4=R1=1.

In one or more embodiments, at the end of the process of generating 20 an allocation schedule 216, e.g., for the execution of the first four layers L1, L2, L3, L4, for an artificial neural network as exemplified in FIG. 2B, the allocation schedule 216 may comprise a list of commands which may be expressed as, for instance as exemplified in the following Table I.

TABLE I example of a portion of commands included in the allocation schedule 216

Store T1, s1
Store T2, s2
Store T3, s3

TABLE I-continued example of a portion of commands included
in the allocation schedule 216

Store T4, s4
Delete T2 where s1, s2, s3, s4 are indicative of the sizes of respective numbered data buffers T1, T2, T3, T4. Sizes of data buffers can be different and can change.

Figure 4:
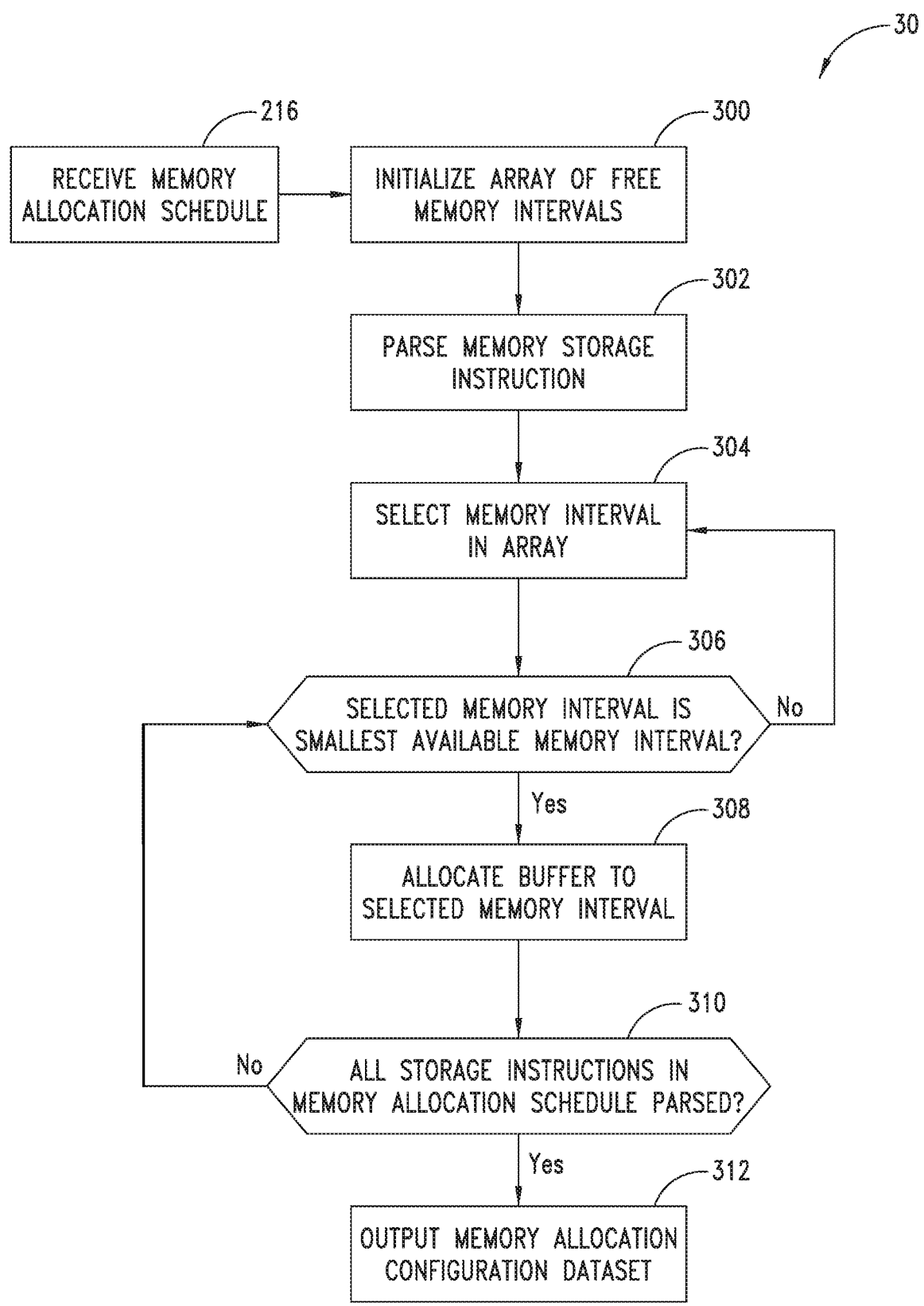
FIG. 4 is an embodiment of a greedy heap allocation method for implementing an artificial neural network.

FIG. 4 is a diagram exemplary of a "greedy heap" allocation method 30 to execute neural network layers in a sequential fashion on a single micro controller, MCU, processor (e.g., STM32) and using the (statically) allocated allocation schedule 216 (or work buffer). Such a method 30 may foresee to allocate buffers T1, T2, T3, T4, T5, T6 according to the allocation schedule 216 and starting from the base address, e.g., of 0, and keeping a list of free memory intervals. For instance, such a list of free memory intervals may be initialized with the values of (base address, maximum heap size) where heap size is the sized of the total free memory available. At each allocation, the smallest memory interval which can store the buffer is selected, the buffer stored and the list of free intervals updated. When a buffer is freed, its area is added to the free memory intervals and consecutive intervals merged.

In one or more embodiments as exemplified in FIG. 4, the greedy heap allocation method 30 may comprise:
  initializing 300 a list of free memory intervals, e.g., an array comprising a set of tuples including values indicative of (base address, maximum heap size);
  receiving 302 the allocation schedule 216 and parsing 302 instruction contained in the allocation schedule one by one;
  selecting 304 a memory interval in the list of free memory intervals;
  verifying 306 that the selected memory interval in the list of free memory intervals is the smallest memory interval in the list which can contain the first buffer to be stored such as T1 having size s1, and:
    in case of a positive result in 306, allocate 308 the buffer to the selected memory interval and update the list of free intervals;
    otherwise, return to 304 and keep checking the list of memory intervals until the minimum one to allocate the buffer is selected;
    if the buffer is allocated in 308, check when the buffer may be deallocated as a result of a corresponding command in the allocation schedule 216 being parsed; and
    if so, merge the deallocated buffer with subsequent free intervals and update the list of memory intervals consequently.

Once all of the storage instructions in the memory allocation schedule are parsed in 310, a memory allocation configuration data set is provided as an output.

A drawback of this solution may be that, if a buffer is bigger than any available intervals, it has to be allocated at the end of the heap, potentially wasting memory.

In one or more embodiments, a packed slot allocation method 32 may be used, e.g., envisaging a best fit strategy (e.g., including to find the smallest slot which can fit, or the largest slot otherwise).

In one or more embodiments, the packed slot allocation method 32 may keep track of the allocated buffers using a set of slots MS.

One or more embodiments may comprise providing 320 a set of slots MS, wherein a slot in the set of slots MS may "point to" the portion of memory including the allocated buffer, e.g., encoding its name, starting memory address and size. In one or more embodiments, a slot may be initialized before any buffer is encoded thereto with an "empty" tag or "0".

Figure 5:
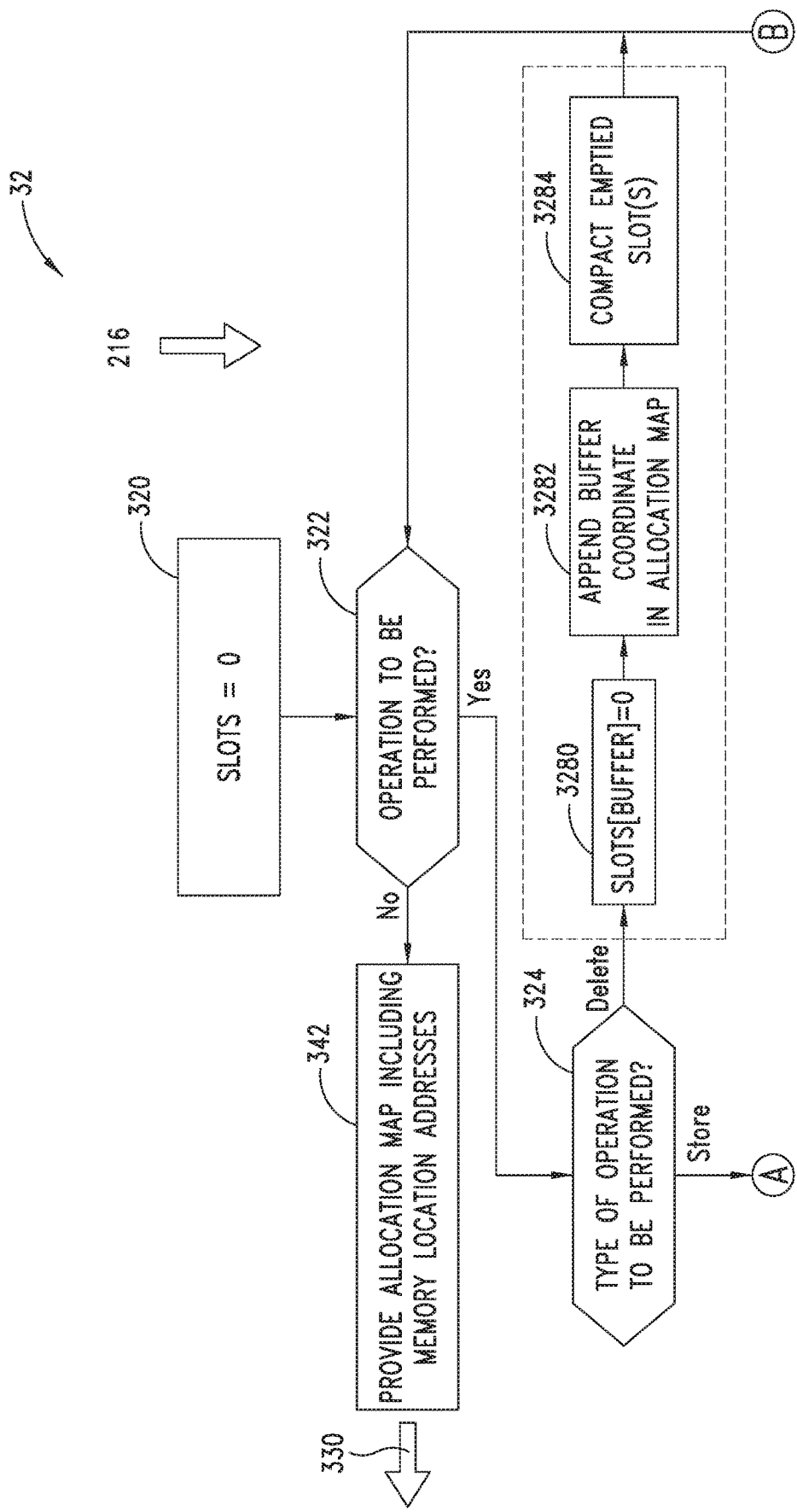
FIG. 5 is an embodiment of a packed slot allocation method for implementing an artificial neural network.
Figure 5:
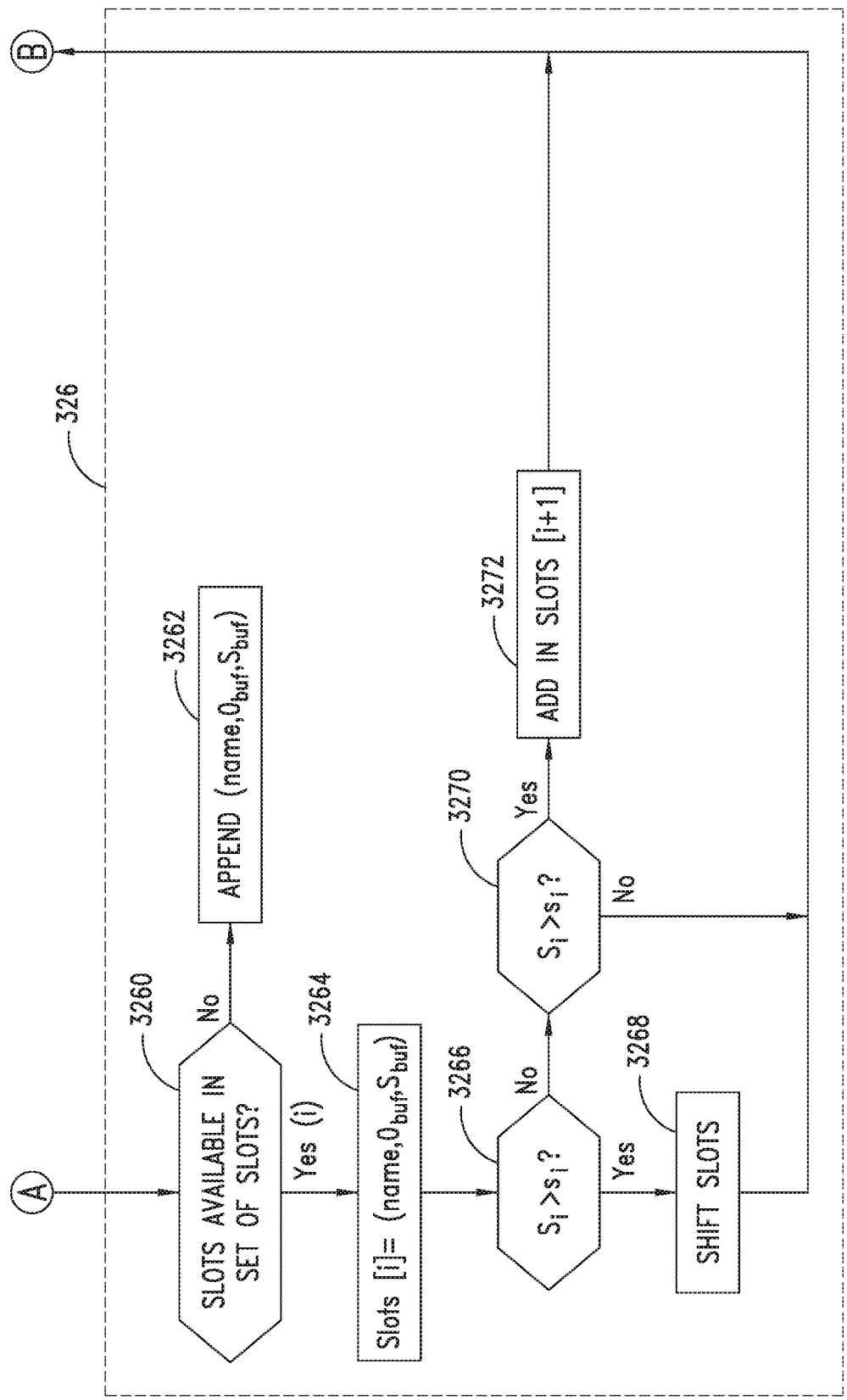

In one or more embodiments as exemplified in FIG. 5, the pipeline 32 may parse the allocation schedule 216 and perform the operations of:
  initializing 320 an empty slot set MS, e.g., MS=(MS1)=0;
  checking 322 whether there is any operation to be performed; and
  if not, exiting the pipeline to provide 324 to a user circuit, e.g., an MCU micro-processor, an allocation map B including memory location addresses wherein buffers may be stored during ANN execution,
  otherwise, checking the type of operation to be performed and perform sub-pipelines accordingly, as discussed in the following.

In one or more embodiments, for instance:
  if the operation parsed from the allocation schedule is an operation of type "Store", the method 32 may foresee to execute a first sub-pipeline of operations 326; and
  if the operation parsed from the allocation schedule is an operation of type "Delete", enter a second sub-pipeline of operations 328.

In one or more embodiments, the pipeline 32 may provide as an output a configuration dataset 330 including a set of memory addresses wherein to store one or more respective buffers, the set of memory addresses in the configuration dataset 330 being computed 30, 32 so as to minimize the memory usage and avoid overwriting of data needed by the neural network layers.

In one or more embodiments, the first sub-pipeline 326 may comprise:
  verifying 3260 whether there are any slots available in the set of slots MS; for instance, in the example considered the slot set includes a free "empty" slot MS1, hence this slot is selected; otherwise, if no slot is empty, a new empty slot MS1 may be appended to the set of slots and subsequently selected.

In one or more embodiments, the size of an empty slot in the set of slots may be computed 3264 as a difference between an address of a next slot in the set of slots and the address added to the size of the previous slot.

For instance, the set of slots MS may include three slots MS1, MS2, MS3 wherein:
  the first slot MS1 may be in use to point to the first buffer T1 and may have a first slot size S1 equal to the size of the first buffer s1 and a starting address o1;
  the second slot MS2 may be empty; and
  the third slot MS3 may be in use to point to the third buffer T3 and may have a third slot size S3 equal to the size of the third buffer s3 and a starting address o3.

In such an example, during the operation 3264 of computing the size of the slot MS2, the second slot may have its size computed as: S2=o3−(o1+S1).

In general, the size of the i-th slot in the set of slots may be computed 3264 as:

$$S_i = O_{i+1} - (o_{i-1} + s_{i-1})$$

In one or more embodiments, the first sub-pipeline 326 comprises verifying 3266 whether the size of the buffer to be allocated according to the address scheduler parsed instruction, for instance s2, is greater than the computed slot size S2. Such a verifying 3266 operation may result in two cases wherein a predetermined sequence of operations may be performed, respectively, as discussed in the following.

In one or more embodiments, a buffer size, e.g., s2, may be smaller than slot size, e.g., S2.

In one or more embodiments, as a result of a negative outcome of the operation of verifying 3266, the second buffer T2 may be allocated in the slot, and such an allocation may be followed by a further operation of size verification 3270.

In such a further verifying operation 3270, it may be evaluated whether the size of the buffer T2 is strictly smaller than the size of the slot MS2.

In case the result of such a further verification is positive, a new slot MS' may be generated 3272, sandwiched between the processed slot MS2 and a slot right after the one being considered, e.g., MS3.

Figure 6:
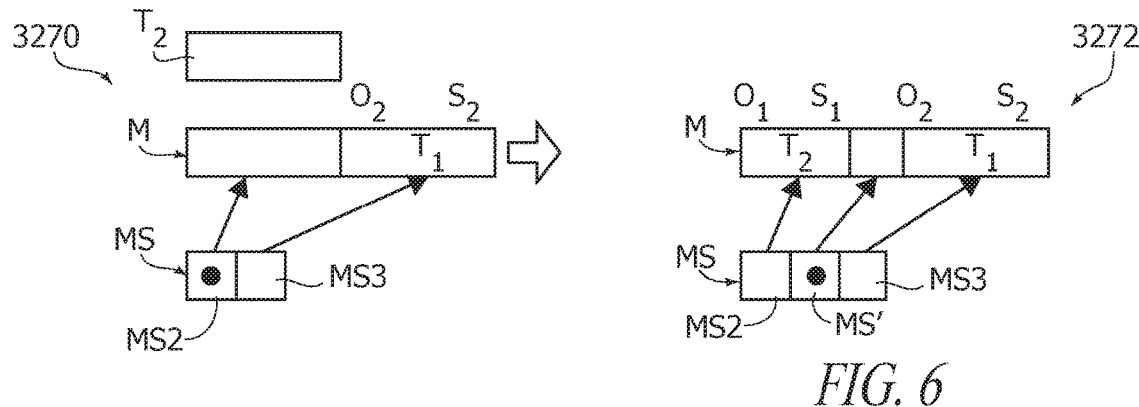
FIG. 6 is an embodiment of a diagram of verification of a size of a data buffer relative to a memory slot.

FIG. 6 is a diagram exemplary of principles underlying such an operation of further verification 3270 in the case wherein the size of the buffer is strictly smaller than the size of the slot. In the set of slots MS, black dots indicate empty slots and no labels in a memory M indicate free memory areas.

For instance, after verifying (for instance, visually) that the second buffer T2 is smaller than the portion of memory M towards which the second slot MS2, a new slot MS' is introduced as exemplified in portion b of FIG. 6.

In one or more embodiments, the method may foresee as a special case that if the buffer to be allocated is the last one to allocate according to the parsed address allocation schedule, no slot is added in the operation 3272.

In one or more embodiments, pairs of empty slots are merged and if a slot is only partially filled, a new empty slot is created right after it to enable the allocation of the remaining memory as discussed in the following.

In one or more embodiments, as a result of a positive outcome of the verification 3266, e.g., if s2>S2, then the first sub-pipeline 326 includes an operation of shifting slots in the set of slots MS that follow the current slot, e.g., MS2, by a quantity, e.g., 6. Specifically, if the memory to allocate to host the buffer, e.g., T2, is bigger than the size of the slot, e.g., S2, all the subsequent assigned slot addresses are shifted to fit the new buffer and prevent memory overflows.

Figure 7:
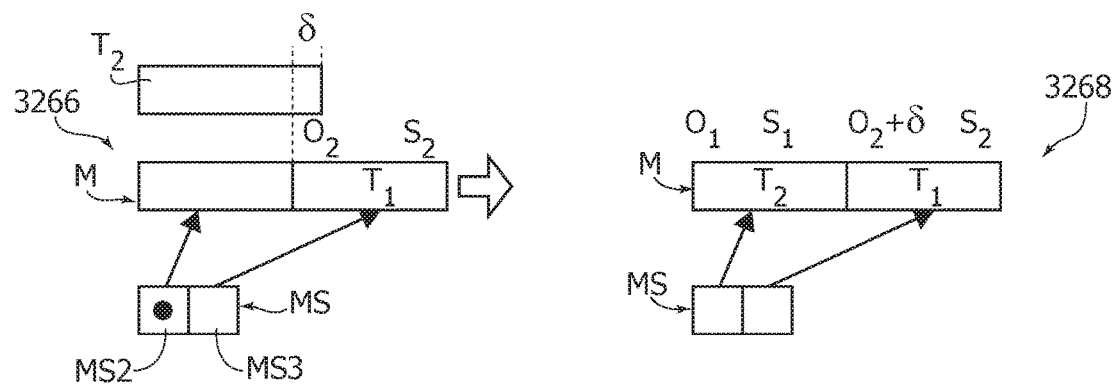
FIG. 7 is an embodiment of a diagram of verification of a size of a data buffer relative to a memory slot.

FIG. 7 is a diagram exemplary of principles underlying such an operation of verification 3266 in the case wherein the size s2 of the buffer T2 is greater than the size S2 of the slot MS2.

In one or more embodiments as exemplified in FIG. 7, as a result of verification 3266 that the size of the buffer to be allocated is greater than slot size S2, the buffer T2 may be allocated solely after the next buffers are shifted to accommodate it.

Specifically, an operation of shifting slots 3268 may comprise, as exemplified in FIG. 7:

computing the difference between the buffer size s2 and the slot size S2, e.g., $\delta = s2 - S2$;

shifted slots addresses may be computed as a result of adding the computer difference value to all the addresses of the subsequent non-empty slots, e.g., $o3 = o3 + \delta$.

In general, such a computation of the difference for the i-th buffer and slot may be expressed as:

$$\delta = s_i - S_i$$

and the shifted slot address for a j-th slot address in the set of slots may be expressed as:

$$o_j := o_j + \delta \, \forall j | slot \neq \emptyset$$

As mentioned, in case the parsed instruction is of type "Delete" indicating an operation of freeing memory space by deallocating a buffer, the sub-pipeline 328 may be executed.

Figure 8:
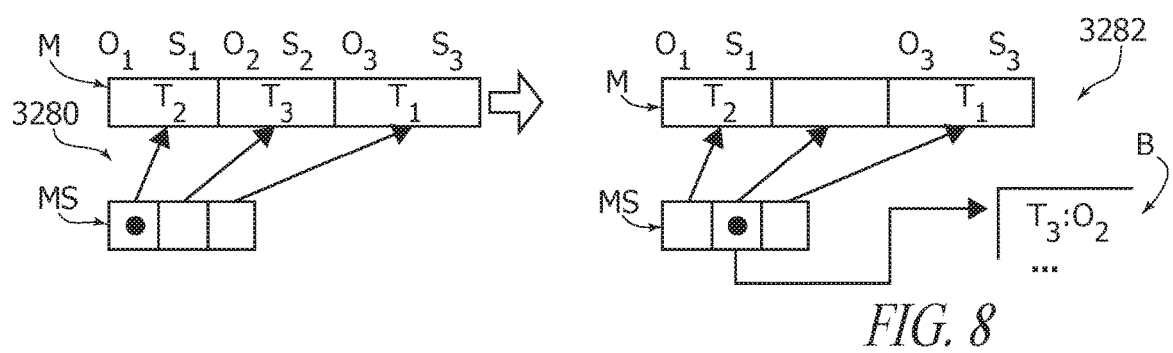
FIG. 8 is an embodiment of a diagram of deallocation of a data buffer.

In one or more embodiments, such a second sub-pipeline 328 for deallocating a buffer may comprise, as exemplified in FIGS. 4 and 8:

assigning 3280 an empty value to the slot containing the buffer to be deallocated; and appending 3282 the buffer coordinate in the allocation map, wherein the buffer coordinates include a tuple including: (buffer name, memory offset)

Figure 9:
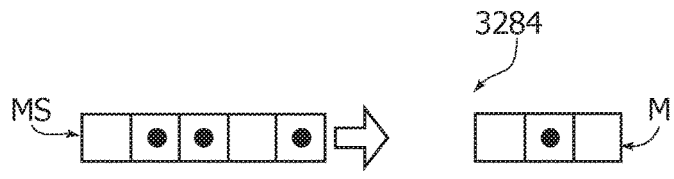
FIG. 9 is an embodiment of a diagram of merging memory slots.

In one or more embodiments, the second sub-pipeline 328 may also comprise a stage of compacting emptied slots 3284, as exemplified in FIGS. 4 and 9.

After several allocations and deallocations, several consecutive slots may be left empty; to prevent that, after each deallocation pairs of consecutive empty slots are merged into one and empty slots at the end of the list may be removed.

Compacting buffers and shifting buffers may be convenient in particular for the execution of a convolutional neural network, where the input is initially expanded before undergoing through subsampling stages, e.g., by pooling or filter strides.

As discussed in the foregoing, to summarize, one or more embodiments include at least two strategies to select a new slot available:

"greedy" 30, configured to find the first available slot; and

"best fit" 32, configured to find the smallest slot which can fit, or the largest slot otherwise.

In one or more embodiments, although the best fit strategy 32 may be more efficient, an optimal memory allocation may be reached already with the greedy strategy 30.

In one or more embodiments, optimal memory allocation may be defined as the maximum sum of allocated buffers, discarding empty memory intervals. The allocated memory dimension is defined as the maximum o+s sum among all the buffers in the allocation map B after all the nodes in the neural network graph 100 have been visited.

In one or more embodiments, the first sub-pipeline 326 may be coupled back to the stage 322 of checking 322 whether there is any operation to be performed wherein the computed memory address, e.g., o3, for the buffer to be stored is added to the allocation map.

Table II below provides a summary of experiment results indicative of the advantageous performance of applying the computer implemented method as discussed herein to three well-known artificial neural network circuits. Specifically, experiments include circuits indicated as:

Howard, Andrew G., et al.: "Mobilenets: Efficient convolutional neural networks for mobile vision applications", arXiv preprint arXiv:1704.04861 (2017);

landola, Forrest N., et al. "SqueezeNet: AlexNet-level accuracy with 50× fewer parameters and <0.5 MB model size." arXiv preprint arXiv:1602.07360 (2016); and Inception v3, discussed for instance in document Szegedy, C., Vanhoucke, V., loffe, S., Shlens, J., & Wojna, Z. (2016). Rethinking the inception architecture for computer vision. In Proceedings of the IEEE conference on computer vision and pattern recognition (pp. 2818-2826).

Three estimated values are given in Table II for every ANN type:
- column "Total RAM" includes the total size of the buffers in the case in which no optimization is performed is reported;
- column "Heap RAM" includes the minimum memory size employed for a greedy heap approach 30 (find the smallest free memory interval); and
- column "Packed RAM" includes the minimum memory size employed for the proposed packed approach 32, which in one or more embodiments may have a value close or equal to a minimum "theoretical" RAM size.

TABLE II

Comparison of the packed allocation with the total buffer RAM and the RAM for a greedy heap approach

| Network | Total RAM | Heap RAM | Packed RAM |
|---|---|---|---|
| MobileNet | 4.77 MB | 1.53 MB | 1.15 MB |
| SqueezeNet | 16.73 MB | 3.14 MB | 2.95 MB |
| Inception v3 | 54.75 MB | 10.62 MB | 7.91 MB |

As visible by comparing values in the respective columns of Table II, the packed approach 32 may reach the lower memory bound, that is the maximum of the sum of the allocated buffer at any time during execution. This reachable lower memory bound is equal to the theoretical minimum RAM memory used for execution of the given schedule, providing a very good memory allocation optimization.

One or more embodiments may foresee the use of multiple buffers for different branches of the artificial neural network. One or more embodiments may use dynamic allocation for sub-networks in the artificial neural network. In one or more embodiments, dynamic allocation may process a sub-network in the sub-networks as an "independent" graph.

Figure 10:
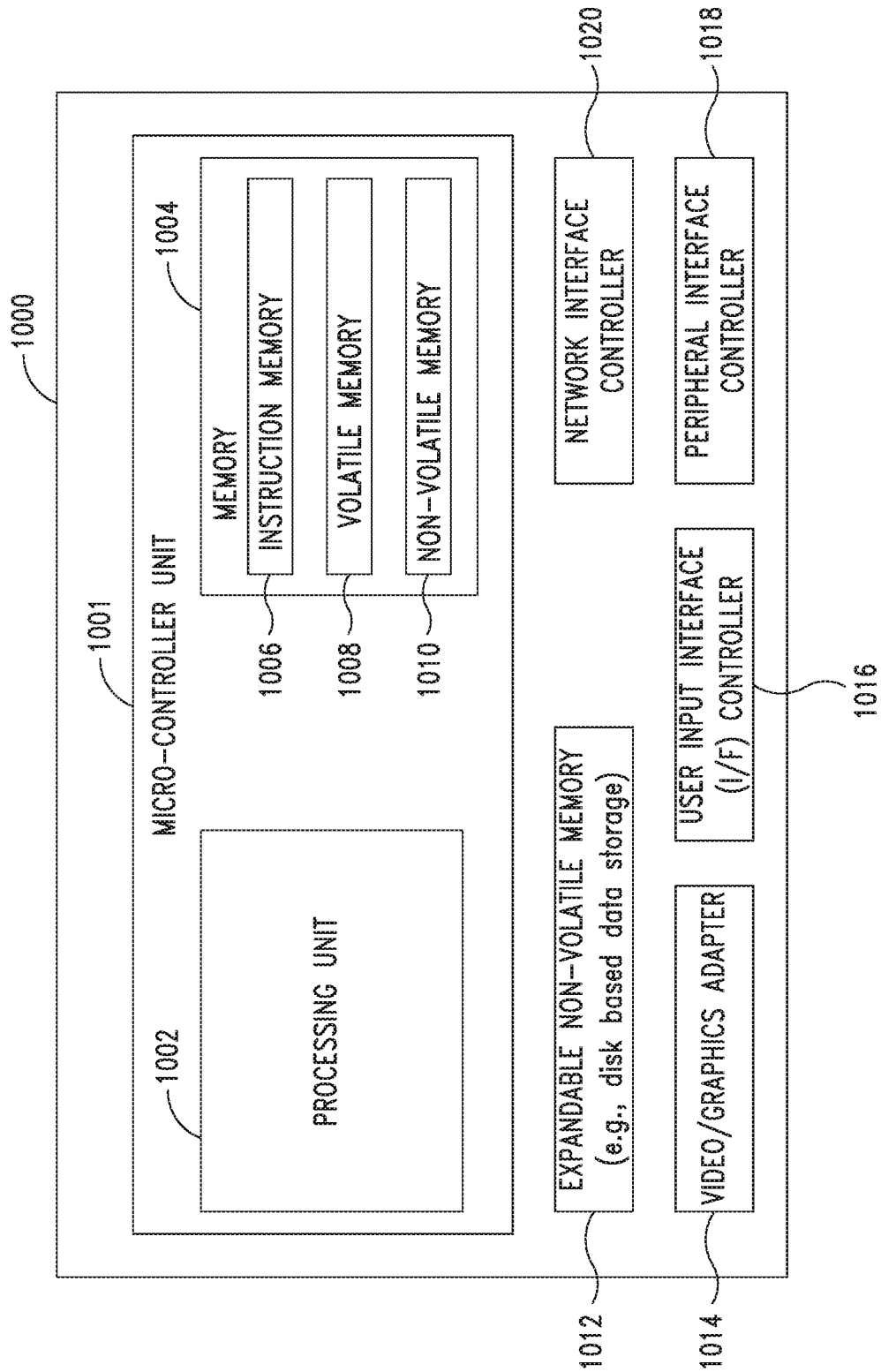
FIG. 10 is an embodiment of a computer system for implementing an artificial neural network according to one or more embodiments.

FIG. 10 is an exemplary diagram illustrating an exemplary system 1000, e.g., computer processing system adapted to implement one or more portions of the method disclosed herein.

Such a system 1000 may comprise a micro-controller unit 1001 specifically configured as described herein.

In one or more embodiments, the micro-controller unit 1001 may comprise a processing unit 1002, and memory 1004.

In one or more embodiments, the memory 1004 may comprise instruction memory 1006, volatile memory 1008, and non-volatile memory 1010. The micro-controller unit 1001 may further comprise networking circuitry between processing unit and memory to exchange data therebetween, e.g., via data buses not visible for the sake of simplicity in FIG. 10. Such networking circuitry may comprise any of several types of well-known bus structures using any of a variety of bus architectures. Example architectures include Industry Standard Architecture (ISA) bus, Micro Channel Architecture (MCA) bus, Enhanced ISA (EISA) bus, Video Electronics Standards Associate (VESA) local bus and Peripheral Component Interconnect (PCI) also known as Mezzanine bus.

In one or more embodiments, the processing unit 1002 may comprise one or more processing cores and/or one or more special purpose cores (e.g., DSP core, floating point, GPU, and neural network optimized core). The one or more general purpose cores execute general purpose opcodes while the special purpose cores execute functions specific to their purpose.

In one or more embodiments, the memory 1004 may comprise cache registers, dynamic random-access memory (DRAM) or extended data out (EDO) memory, or other types of memory such as ROM, static RAM, flash, and non-volatile static random-access memory (NVSRAM), bubble memory, etc.

Various components connected to the system bus include, but are not limited to, expandable non-volatile memory (e.g., disk based data storage) 1012, video/graphics adapter 1014, user input interface (I/F) controller 1016 configured to be connected to one or more input devices such as a keyboard, peripheral interface controller 1018 configured to be connected to one or more external peripherals such as printer, and a network interface controller 1020 which may be coupled to one or more devices, such as data storage, remote computer running one or more remote applications, via a network which may comprise the Internet cloud, a local area network (LAN), wide area network (WAN), storage area network (SAN), etc.

The system 1000 may operate in a networked environment via connections to one or more remote computers, such as a remote computer. The remote computer may comprise a personal computer (PC), server, router, network PC, peer device or other common network node, and typically includes many or all of the elements described supra.

It is noted that other digital computer system configurations can also be employed to implement the system and methods of the present disclosure, and to the extent that a particular system configuration is capable of implementing the system and methods of the present disclosure.

One or more embodiments may comprise a computer implemented method, comprising:
- providing data processing circuitry for an artificial neural network circuit (for instance, 100), the data processing circuitry including data buffers (for instance, T1, T2, T3, T4, T5, T6) in a virtual memory circuitry;
- coupling the data buffers in said virtual memory circuitry to respective processing layers (for instance, L1, L2, L3, L4, L5, L6) in the artificial neural network circuit and obtaining an ordered visiting sequence of layers of the artificial neural network;
- producing (for instance, 20), as a function of said ordered visiting sequence of layers of the artificial neural network, a virtual memory allocation schedule (for instance, A), the virtual memory allocation schedule (for instance, A) including a set of instructions for memory allocation and deallocation operations applicable to said data buffers in said virtual memory circuitry coupled to processing layers of the artificial neural network circuit; and
- computing (for instance, 30; 32), as a function of said virtual memory allocation schedule, a physical memory configuration dataset (for instance, 330) for the artificial neural network circuit, said physical memory configuration dataset comprising sizes and addresses of physical memory locations for the artificial neural network circuit. Physical memory, as referred to herein, refers to data storage that is included in or directly accessible by a processor (e.g., micro-controller unit 1001 in FIG. 10). Physical memory is typically volatile memory, such as cache memory or RAM, and stores executable instructions for direct access by the processor. By contrast, virtual memory is separate from the physical memory and is mapped to physical memory during execution.

In one or more embodiments, coupling data buffers (for instance, T1, T2, T3, T4, T5, T6) in a virtual memory circuitry to respective processing layers (for instance, L1, L2, L3, L4, L5, L6) of the neural network (for instance, 100) may include:
  configuring said data processing circuitry as a directed acyclic graph, wherein data buffer nodes in the data buffers in the virtual memory circuitry are univocally coupled to respective layer processing nodes in said processing layers of the neural network circuit.

One or more embodiments may comprise parsing (for instance, 20) said directed acyclic graph and determining dependencies between said processing layers of the neural network circuit.

In one or more embodiments, producing (for instance, 20) said virtual memory allocation schedule (for instance, A), may comprise a sequence of:
  i) initializing (for instance, 200) a first reference count (for instance, R1) for a first visited data buffer (for instance, T1) in the virtual memory circuitry coupled to a first processing layer (for instance, L1) in the artificial neural network circuit to a value equal to the number of processing layers (for instance, L2, L5) in the artificial neural network circuit coupled to the first visited data buffer;
  ii) generating (for instance, 202) a memory allocation command for the first visited data buffer (T1) having its first reference count initialized (R1);
  iii) initializing (for instance, 206) a second reference count (for instance, R2) for a second visited data buffer (for instance, T2) in the virtual memory circuitry coupled to a second processing layer (for instance, L2) in the artificial neural network circuit to a value equal to the number of processing layers in the artificial neural network circuit coupled to the second visited data buffer;
  iv) decrementing (for instance, 208) the value of the reference count (for instance, R2) associated to the second visited buffer node (for instance, T2) as a result of visiting one of the processing layers (for instance, L3, L4) which are coupled to the second visited data buffer node (for instance, L2);
  v) decrementing (for instance, 210) the value of the first reference count (for instance, R1) at least for the first visited data buffer (for instance, T1), and
    checking whether any of the initialized reference counts (for instance, R1, R2) has reached a value of zero as a result of said decrementing (for instance, 208),
    generating a command of buffer deallocation for the data buffer whose reference count has reached zero (for instance, 212), and
    iterating (for instance, 214) said set of sequential operations until the end of the ordered visiting sequence of layers of the neural network, providing the memory allocation schedule including the generated set of memory allocation commands.

In one or more embodiments, computing (for instance, 30), as a function of said virtual memory allocation schedule, a physical memory configuration dataset for the artificial neural network circuit may comprise greedy heap allocation operations including:
  initializing (for instance, 300) a list of memory intervals comprising a set of tuples including values indicative of a base physical memory address and of a maximum heap size;
  receiving (for instance, 302) said virtual memory allocation schedule and sequentially parsing the set of instructions included therein, wherein:

a) as a result of parsing an instruction of storing a data buffer (for instance, S1):
    selecting (for instance, 304) a temporary memory interval in a list of memory intervals;
    comparing (for instance, 306) a size of the selected temporary memory interval in the list of memory intervals with a size (for instance, s1) of the data buffer (for instance, S1) to be stored (for instance, T1) having size (for instance, s1); and
    in case of a positive result (for instance, 308), allocating the buffer (for instance, S1) to the selected memory interval and update the list of memory intervals,
    otherwise, keep checking the list of memory intervals until the minimum one to allocate the buffer is selected;
b) as a result of an instruction of deallocating a data buffer being parsed:
    deallocating (for instance, 306) said buffer from memory and merge the freed memory interval with subsequent free memory intervals, updating the list of memory intervals consequently; and
    iterating (for instance, 310) greedy heap allocation operations until the entire set of instructions in the virtual memory allocation schedule is parsed; and
c) as a result of parsing a last instruction in the set of instructions in the virtual memory allocation schedule:
    providing 312 as an output said memory allocation configuration dataset associated with the neural network.

In one or more embodiments, computing (for instance, 32), as a function of said virtual memory allocation schedule, a physical memory configuration dataset for the artificial neural network circuit includes keeping track of the allocated buffers using a set of slots (for instance, MS) configured to point towards memory intervals in the list of memory intervals (for instance, M). One or more slots in said set of slots may store coordinates or values (e.g., "pointers") that reference memory locations in which the data buffer name, starting memory address, and/or data buffer size of the allocated data buffer are stored.

In one or more embodiments, the method may include:
  initializing (for instance, 320) an empty set of slots (for instance, MS); and
  receiving (for instance, 322) said memory allocation schedule and sequentially parsing the set of instructions therein, wherein:
a) as a result of parsing an instruction of storing a data buffer, executing a first pipeline of operations (for instance, 326), the first pipeline of operations including:
    verifying (for instance, 3260) whether there are any slots available in the set of slots; otherwise, appending a new empty slot (for instance, MS1) to the set of slots and subsequently selecting it; and
    computing (for instance, 3264) the size of an empty slot in the set of slots may be as a difference between an address of a next slot in the set of slots and the address added to the size of the previous slot wherein a slot (for instance, MS) may be in use to point to a respective buffer (for instance, T1) and may have a slot size (for instance, S1) equal to:

$$S_i = o_{i+1} - (o_{i-1} + s_{i-1})$$

comparing the computed slot size with a size of the data buffer to be stored according to the parsed instruction in the set of instructions; and finding the smallest slot or the largest slot wherein the data buffer fits;
b) as a result of parsing a data buffer deallocating instruction, executing a second pipeline of operations (for instance, 328), the second pipeline of operations including:
assigning (for instance, 3280) an empty value to the slot containing the data buffer (for instance, T1) to be deallocated;
appending (for instance, 3282) the slot coordinate in the memory allocation configuration dataset;
compacting pairs of consecutive empty slots, merging into one and empty slots; and
c) as a result of parsing a last instruction in the set of instructions:
removing slots (for instance, 3284) at the end of the list of memory intervals; and
providing (for instance, 324) to a user circuit an allocation configuration dataset including memory location addresses wherein data buffers (for instance, T1, T2, T3, T4, T5, T6) may be stored during neural network execution.

In one or more embodiments, finding the smallest slot or the largest slot wherein the data buffer fits includes applying a first operation of comparing (for instance, 3266) the size of the data buffer to be allocated with the computed slot size (for instance, S) and:
a) as a result of the data buffer size being greater than the slot size, shifting subsequent slots and allocating the data buffer to the slot; and
b) as a result of the data buffer being smaller than the slots size, applying a second operation of comparing (for instance, 3270) said slot size with the buffer to determine whether the buffer and the slot have a same size or the slot has a size greater than the buffer, and
  i) as a result of the slot and the buffer having a same size, allocating the buffer, and
  ii) as a result of the buffer being strictly smaller than the size of the slot, introducing a new slot (for instance, MS') sandwiched between the processed slot (for instance, MS2) and a slot right after the one being considered (for instance, MS3) to enable the allocation of the remaining memory as discussed in the following.

In one or more embodiments, shifting the buffer may include:
computing a difference (for instance, $\delta$) between the buffer size (for instance, s2) and the slot size (for instance, S2) as $\delta = s_i - S_i$; and
computing a set of slot coordinates as a result of adding the computed difference to any of the addresses of the subsequent non-empty slots, as $o_j := +\delta \forall j | slot \neq \emptyset$ One or more embodiments may comprise a micro-controller unit (for instance, 1001), comprising:
memory circuitry (for instance, 1004), including memory portions configured to be allocated or deallocated to host data buffers; and
at least one processing circuit (for instance, 1002) coupled to said memory circuitry (for instance, 1004) and configured to perform operations of one or more embodiments of the computer-implemented method.

One or more embodiments may comprise a computer program product comprising software code portions which, when executed in at least one processing circuit (for instance, 1002), configure such at least one processing circuit to perform operations one or more embodiments of the computer-implemented method.

It will be otherwise understood that the various individual implementing options exemplified throughout the figures accompanying this description are not necessarily intended to be adopted in the same combinations exemplified in the figures. One or more embodiments may thus adopt these (otherwise non-mandatory) options individually and/or in different combinations with respect to the combination exemplified in the accompanying figures.

Without prejudice to the underlying principles, the details and embodiments may vary, even significantly, with respect to what has been described by way of example only, without departing from the extent of protection. The extent of protection is defined by the claims.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, convolutional accelerators, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method, comprising:
coupling virtual data buffers to respective processing layers of an artificial neural network;
obtaining an ordered visiting sequence of layers of the artificial neural network;
producing, as a function of the ordered visiting sequence of layers, a virtual memory allocation schedule that includes a set of instructions that specify memory allocation operations and memory deallocation operations applicable to the virtual data buffers; and
computing, based on the virtual memory allocation schedule, a physical memory configuration dataset for the artificial neural network, the physical memory configuration dataset comprising sizes and addresses of physical memory locations for the artificial neural network, wherein the method comprises:

initializing a first reference count for a first visited data buffer in the virtual data buffers having an input coupled to a first processing layer in the artificial neural network to a first value equal to a number of processing layers of the artificial neural network having inputs coupled to the first visited data buffer;

generating a memory allocation command for the first visited data buffer having the first reference count initialized;

initializing a second reference count for a second visited data buffer in the virtual data buffers having an input coupled to a second processing layer in the artificial neural network to a second value equal to the number of processing layers of the artificial neural network having inputs coupled to the second visited data buffer;

decrementing the second reference count as a result of visiting one of the processing layers having inputs coupled to the second visited data buffer;

decrementing the first reference count as a result of visiting one of the processing layers having inputs coupled to the first visited data buffer;

determining whether the first reference count or the second reference count equals a value of zero as a result of the decrementing;

deallocating, as a result of determining that the first reference count or the second reference count reached zero, a visited data buffer whose reference count has reached zero; and iterating the set of sequential operations until an end of the ordered visiting sequence of layers of the artificial neural network is reached.

2. The computer-implemented method of claim 1, comprising:

configuring data processing circuitry for the artificial neural network according to a directed acyclic graph representing the virtual memory allocation schedule, wherein data buffer nodes in the virtual data buffers are univocally coupled to respective layer processing nodes in the processing layers of the artificial neural network.

3. The computer-implemented method of claim 2, comprising:

parsing the directed acyclic graph; and determining dependencies between the processing layers of the artificial neural network.

4. A computer-implemented method, comprising:

coupling virtual data buffers to respective processing layers of an artificial neural network;

obtaining an ordered visiting sequence of layers of the artificial neural network;

producing, as a function of the ordered visiting sequence of layers, a virtual memory allocation schedule that includes a set of instructions that specify memory allocation operations and memory deallocation operations applicable to the virtual data buffers; and computing, based on the virtual memory allocation schedule, a physical memory configuration dataset for the artificial neural network, the physical memory configuration dataset comprising sizes and addresses of physical memory locations for the artificial neural network, wherein the method comprises:

initializing a list of memory intervals comprising a set of tuples including values indicative of a base physical memory address and of a maximum heap size; and sequentially parsing the set of instructions included in the virtual memory allocation schedule;

as a result of parsing an instruction in the set of instructions to allocate a first data buffer:

determining, in the list of memory intervals, a temporary memory interval having a smallest size sufficient to store the first data buffer;

allocating the first data buffer in the temporary memory interval; and updating the list of memory intervals to indicate the temporary memory interval as allocated; and as a result of parsing an instruction in the set of instructions to deallocate a second data buffer:

deallocating the second data buffer from memory;

merging a memory interval freed as a result of deallocating the second data buffer with one or more free memory intervals in the list of memory intervals; and updating the list of memory intervals to indicate the memory interval freed, wherein the physical memory configuration dataset is calculated in connection with parsing the set of instructions.

5. The computer-implemented method of claim 4, comprising:

initializing a first reference count for a first visited data buffer in the virtual data buffers having an input coupled to a first processing layer in the artificial neural network to a first value equal to a number of processing layers of the artificial neural network having inputs coupled to the first visited data buffer;

generating a memory allocation command for the first visited data buffer having the first reference count initialized;

initializing a second reference count for a second visited data buffer in the virtual data buffers having an input coupled to a second processing layer in the artificial neural network to a second value equal to the number of processing layers of the artificial neural network having inputs coupled to the second visited data buffer;

decrementing the second reference count as a result of visiting one of the processing layers having inputs coupled to the second visited data buffer;

decrementing the first reference count as a result of visiting one of the processing layers having inputs coupled to the first visited data buffer;

determining whether the first reference count or the second reference count equals a value of zero as a result of the decrementing;

deallocating, as a result of determining that the first reference count or the second reference count reached zero, a visited data buffer whose reference count has reached zero; and iterating the set of sequential operations until an end of the ordered visiting sequence of layers of the artificial neural network is reached.

6. The computer-implemented method of claim 4, comprising:

tracking each data buffer allocated based on a set of slots referencing one or more memory intervals in the list of memory intervals that store a data buffer name, a starting memory address, and a data buffer size of the data buffer allocated.

7. The computer-implemented method of claim 6, comprising:

as a result of parsing the instruction to allocate the first data buffer, executing a first pipeline of operations that include:

determining whether the set of slots include an available slot;

appending a new slot to the set of slots as a result of determining that no slots are available, the new slot being empty;

computing a size of an empty slot in the set of slots based on a difference between an address of a next slot subsequent to the empty slot and an address of a previous slot to the empty slot added to a size of the previous slot;

comparing the size of the empty slot with a size of the first data buffer; and finding a smallest slot of the set of slots in which the first data buffer fits;

as a result of parsing the instruction to deallocate the second data buffer, executing a second pipeline of operations that include:

assigning an empty value to a slot containing the second data buffer;

appending a coordinate of the slot in the physical memory configuration dataset;

as a result of detecting a pair of consecutive empty slots in the set of slots, merging the pair of consecutive empty slots into a single empty slot; and as a result of parsing a last instruction in the set of instructions:

removing a third slot at an end of the list of memory intervals if the third slot is empty; and providing, to a processing circuit, the physical allocation configuration dataset that includes memory location addresses of data buffers for implementing the artificial neural network.

8. The computer-implemented method of claim 7, comprising:

as a result of the first data buffer size being greater than the size of the empty slot, shifting one or more slots subsequent to the empty slot and allocating the first data buffer to the empty slot; and as a result of the empty slot and the buffer having a same size, allocating the buffer; and as a result of the size of the first data buffer being smaller than the size of the empty slot, introducing a new empty slot between the empty slot and the next slot.

9. The computer-implemented method of claim 8, comprising:

computing a difference between the size of the first data buffer and the size of the empty slot as $\delta = s_j - S_i$; and computing a set of slot coordinates as a result of adding the difference to an address of a subsequent non-empty slot, wherein shifting the one or more slots is based on the set of slot coordinates.

10. A system, comprising:

memory; and processing circuitry coupled to the memory, the processing circuitry configured to:

couple virtual data buffers to respective processing layers of an artificial neural network;

obtain an ordered visiting sequence of layers of the artificial neural network;

produce, as a function of the ordered visiting sequence of layers, a virtual memory allocation schedule that includes a set of instructions that specify memory allocation operations and memory deallocation operations applicable to the virtual data buffers; and compute, based on the virtual memory allocation schedule, a physical memory configuration dataset for the artificial neural network, the physical memory configuration dataset comprising sizes and addresses of physical memory locations of the artificial neural network, wherein the processing circuitry is configured to:

initialize a list of memory intervals that includes a set of tuples having values indicative of a base physical memory address and of a maximum heap size; and sequentially parse the set of instructions included in the virtual memory allocation schedule, wherein for an instruction parsed in the set of instructions to allocate a first data buffer, allocate the first data buffer to a temporary memory interval having a smallest size sufficient to store the first data buffer;

for an instruction parsed in the set of instructions to deallocate a second data buffer, deallocate the second data buffer from memory; and merge a memory interval freed as a result of deallocating the second data buffer with one or more free memory intervals in the list of memory intervals; and update the list of memory intervals based on allocation or deallocation of data buffers specified in the set of instructions, the physical memory configuration dataset is calculated in connection with parsing the set of instructions.

11. The system of claim 10, wherein the processing circuitry is configured according to a directed acyclic graph representing the virtual memory allocation schedule, wherein virtual data buffer nodes are coupled to respective layer processing nodes in the processing layers of the artificial neural network.

12. The system of claim 11, wherein the processing circuitry is configured to:

parse the directed acyclic graph; and determine dependencies between the processing layers of the artificial neural network.

13. The system of claim 10, wherein the processing circuitry is configured to:

track each data buffer allocated based on a set of slots referencing one or more memory intervals in the list of memory intervals that store a data buffer name, a starting memory address, and a data buffer size of the data buffer allocated.

14. A system, comprising:

memory; and processing circuitry coupled to the memory, the processing circuitry configured to:

couple virtual data buffers to respective processing layers of an artificial neural network;

obtain an ordered visiting sequence of layers of the artificial neural network;

produce, as a function of the ordered visiting sequence of layers, a virtual memory allocation schedule that includes a set of instructions that specify memory allocation operations and memory deallocation operations applicable to the virtual data buffers; and compute, based on the virtual memory allocation schedule, a physical memory configuration dataset for the artificial neural network, the physical memory configuration dataset comprising sizes and addresses of physical memory locations of the artificial neural network, wherein the processing circuitry is configured to:

initialize a first reference count for a first visited data buffer in the virtual data buffers having an input coupled to a first processing layer in the artificial neural network to a first value equal to a number of processing layers of the artificial neural network having inputs coupled to the first visited data buffer;

initialize a second reference count for a second visited data buffer in the virtual data buffers having an input coupled to a second processing layer in the artificial neural network to a second value equal to the number of processing layers of the artificial neural network having inputs coupled to the second visited data buffer;

decrement the first reference count as a result of visiting one of the processing layers having inputs coupled to the first visited data buffer;

decrement the second reference count as a result of visiting one of the processing layers having inputs coupled to the second visited data buffer;

determine whether the first reference count or the second reference count reached a value of zero as a result of the first reference count and the second reference count being decremented;

deallocate, as a result of a determination that the first reference count or the second reference count reached zero, a visited data buffer whose reference count has reached zero; and iterate the set of sequential operations until an end of the ordered visiting sequence of layers of the artificial neural network is reached.

15. The system of claim 14, wherein the processing circuitry is configured to:

initialize a list of memory intervals that includes a set of tuples having values indicative of a base physical memory address and of a maximum heap size; and sequentially parse the set of instructions included in the virtual memory allocation schedule, wherein for an instruction parsed in the set of instructions to allocate a first data buffer, allocate the first data buffer to a temporary memory interval having a smallest size sufficient to store the first data buffer;

for an instruction parsed in the set of instructions to deallocate a second data buffer, deallocate the second data buffer from memory; and merge a memory interval freed as a result of deallocating the second data buffer with one or more free memory intervals in the list of memory intervals; and update the list of memory intervals based on allocation or deallocation of data buffers specified in the set of instructions, the physical memory configuration dataset is calculated in connection with parsing the set of instructions.

16. A non-transitory computer-readable media storing instructions that, as a result of execution by one or more processors, cause the processors to:

couple virtual data buffers to respective processing layers of an artificial neural network;

obtain an ordered visiting sequence of layers of the artificial neural network;

produce, as a function of the ordered visiting sequence of layers, a virtual memory allocation schedule that includes a set of instructions that specify memory allocation operations and memory deallocation operations applicable to the virtual data buffers; and compute, based on the virtual memory allocation schedule, a physical memory configuration dataset for the artificial neural network, the physical memory configuration dataset comprising sizes and addresses of physical memory locations of the artificial neural network, wherein execution of the instructions causes the one or more processors to:

initialize a list of memory intervals that includes a set of tuples having values indicative of a base physical memory address and of a maximum heap size; and sequentially parse the set of instructions included in the virtual memory allocation schedule; and execution of the instructions causes the one or more processors to:

allocate, for an instruction parsed in the set of instructions to allocate a first data buffer, the first data buffer to a temporary memory interval having a smallest size sufficient to store the first data buffer;

deallocate, for an instruction parsed in the set of instructions to deallocate a second data buffer, the second data buffer from memory;

merge a memory interval freed as a result of deallocation with one or more free memory intervals in the list of memory intervals; and update the list of memory intervals based on allocation or deallocation of data buffers specified in the set of instructions, the physical memory configuration dataset in connections calculated in connection with parsing the set of instructions.

17. The non-transitory computer-readable media of claim 16, execution of the instructions causing the one or more processors to:

configure processing circuitry of the one or more processors according to a directed acyclic graph representing the virtual memory allocation schedule, wherein data buffer nodes in the data buffers in the virtual memory circuitry are coupled to respective layer processing nodes in the processing layers of the artificial neural network.

18. The non-transitory computer-readable media of claim 17, execution of the instructions causing the one or more processors to:

parse the directed acyclic graph; and determine dependencies between the processing layers of the artificial neural network.

* * * * *